United States Patent
Darnell et al.

(10) Patent No.: US 10,922,588 B2
(45) Date of Patent: *Feb. 16, 2021

(54) IDENTIFICATION AND/OR VERIFICATION BY A CONSENSUS NETWORK USING SPARSE PARAMETRIC REPRESENTATIONS OF BIOMETRIC IMAGES

(71) Applicant: International Business Machines Corporation, Armonk, NY (US)

(72) Inventors: Shelby Solomon Darnell, Nairobi (KE); Meenal Pore, Nairobi (KE); Srihari Sridharan, Nairobi (KE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/837,526

(22) Filed: Apr. 1, 2020

(65) Prior Publication Data

US 2020/0226435 A1    Jul. 16, 2020

Related U.S. Application Data

(63) Continuation of application No. 16/131,309, filed on Sep. 14, 2018, now Pat. No. 10,713,544.

(51) Int. Cl.
*G06K 9/66* (2006.01)
*G06K 9/62* (2006.01)
(Continued)

(52) U.S. Cl.
CPC ............ *G06K 9/66* (2013.01); *G06F 16/56* (2019.01); *G06K 9/00885* (2013.01);
(Continued)

(58) Field of Classification Search
CPC ...... G06K 9/66; G06K 9/00885; G06K 9/481; G06K 9/6249; G06K 9/46;
(Continued)

(56) References Cited

U.S. PATENT DOCUMENTS 5,497,430 A    3/1996    Sadovnik et al.
5,892,838 A    4/1999    Brady
(Continued)

FOREIGN PATENT DOCUMENTS

CN    103984922 A1    8/2014
CN    105046234 A     11/2015

OTHER PUBLICATIONS

Disclosed Anonymously, "Identifying and Determining Trustworthiness of a Machine-Learned Model", an IP.com Prior Art Database Technical Disclosure, IP.com No. IPCOM000252359D, Jan. 5, 2018, 35 pages.
(Continued)

*Primary Examiner* — Brandon J Miller
(74) *Attorney, Agent, or Firm* — Scully, Scott, Murphy & Presser, P.C.; Shimon Benjamin (57) ABSTRACT

Image data is run through a neural network, and the neural network produces a vector representation of the image data. Random sparse sampling masks are created. The vector representation of the image data is masked with each of the random sparse sampling masks, the masking generating corresponding sparsely sampled vectors. The sparsely sampled vectors are transmitted to nodes of a consensus network, wherein a sparsely sampled vector of the sparsely sampled vectors is transmitted to a node of the consensus network. Votes from the nodes of the consensus network are received. Whether a consensus is achieved in the votes is determined. Responsive to determining that the consensus is achieved, at least one of identification and verification of the image data may be provided.

20 Claims, 4 Drawing Sheets

(51) Int. Cl.
  *G06F 16/56* (2019.01)
  *G06K 9/48* (2006.01)
  *G06N 3/08* (2006.01)
  *G06K 9/00* (2006.01)
(52) U.S. Cl.
  CPC .......... *G06K 9/481* (2013.01); *G06K 9/6249* (2013.01); *G06N 3/08* (2013.01)
(58) Field of Classification Search
  CPC . G06K 2009/4695; G06K 2009/00953; G06K 9/6273; G06K 9/6292; G06N 3/08; G06N 3/0454; G06F 16/56
  See application file for complete search history.

(56) References Cited

U.S. PATENT DOCUMENTS

| | | | | |
|---|---|---|---|---|
| 8,233,751 | B2* | 7/2012 | Patel | G06Q 40/02 382/306 |
| 9,710,631 | B2 | 7/2017 | Bringer et al. | |
| 9,818,136 | B1 | 11/2017 | Hoffberg | |
| 10,552,457 | B2 | 2/2020 | Vlack et al. | |
| 10,607,054 | B2 | 3/2020 | Sahin et al. | |
| 2006/0056722 | A1* | 3/2006 | Moroney | G06T 5/20 382/266 |
| 2011/0135166 | A1 | 6/2011 | Wechsler et al. | |
| 2016/0210533 | A1* | 7/2016 | Kiapour | G06K 9/6256 |
| 2017/0140260 | A1* | 5/2017 | Manning | G10L 25/30 |
| 2017/0302661 | A1 | 10/2017 | Connell, II et al. | |
| 2018/0089497 | A1* | 3/2018 | Romanenko | G06K 9/00221 |
| 2018/0357537 | A1* | 12/2018 | Munkberg | G06N 3/084 |
| 2019/0019014 | A1* | 1/2019 | Ye | G06N 3/084 |

OTHER PUBLICATIONS

Malki, S., et al., "CBAS: A CNN-based Biometrics Authentication System", 2010 12th International Workshop on Cellular Nanoscale Networks and their Applications (CNNA), Feb. 2010, 6 pages.
Ahmadian, K, et al., "Chaotic Neural Network for Biometric Pattern Recognition", Advances in Artificial Intelligence, Received Dec. 8, 2011; Revised Feb. 24, 2012; Accepted Feb. 25, 2012, 10 pages, vol. 2012, Article ID 124176.
Yao, M., et., "An Improved Information Hiding Method Based Sparse Representation", Mathematical Problems in Engineering, Nov. 5, 2014, Revised Dec. 9, 2014, Accepted Dec. 9, 2014, vol. 2015, Article ID 197215, 11 pages.
Jayanthi, N.M., et al., "Multimodal Geometric Sparse Representation for Reliable Social Network Communication", 2016 IEEE International Conference on Advances in Computer Applications (ICACA), Oct. 24, 2016, pp. 55-59.
Bharti, P., "Fingerprint Compression Using Sparse Representation", International Journal of Computer Applications 0975-8887), Dec. 2017, pp. 32-36, vol. 179, No. 3.
Disclosed Anonymously, "Identifying and Determining Trustworthiness of a Machine-Learned Model", An IP. :: om Prior Art Database Technical Disclosure, IP.com No. IPCOM000252359D, Jan. 5, 2018, 35 pages.
Chen, J.-C., et al., "Unconstrained Face Verification using Deep CNN Features", 2016 Winter Conference on Applications of Computer Vision (WACV), Mar. 2016, 9 pages.
Malki, S., et al., "CBAS: A CNN-based Biometrics Authentication System", 2010 12th International Workshop on :; ellular Nanoscale Networks and their Applications (CNNA), Feb. 2010, 6 pages.
Pandey, R., et al., "Deep Secure Encoding: An Application to Face Recognition", https://arxiv.org/pdf/1506.04340.pdf, Jun. 14, 2015, Accessed on Sep. 14, 2018, 10 pages.
Marak, P., et al., "Fingerprint Recognition System Using Artificial Neural Network as Feature Extractor: Design and Performance Evaluation", Taira Mountain Mathematical Publications, 2016, https://www.sav.sk/journals/uploads/0215103309M476_O.pdf, Accessed on Sep. 14, 2018, pp. 117-134, vol. 67.
Lee, J., "Humaniq demonstrating biometric wallet app at Consensus 2017", http://www.biometricupdate.com/201705/humaniq-demonstrating-biometric-wallet-app-at-consensus-2017, May 23, 2017, Accessed on Sep. 14, 2018, 2 pages.
Tseng, K.-K., et al., "ECG Identification System Using Neural Network with Global and Local Features", International Conferences ITS, ICEduTech and STE 2016, Dec. 2016, pp. 3-10.
List of IBM Patents or Patent Applications Treated as Related, dated Apr. 1, 2020, 2 pages.

* cited by examiner

IDENTIFICATION AND/OR VERIFICATION BY A CONSENSUS NETWORK USING SPARSE PARAMETRIC REPRESENTATIONS OF BIOMETRIC IMAGES

BACKGROUND

The present application relates generally to computers and computer applications, and more particularly to cancelable biometrics.

Biometric recognition works by obtaining a biometric signature, a physical or behavioral trait, which can be used to uniquely identify an entity from which the signature was taken. A biometric signature can be represented digitally and two biometric recognition tasks include verification and identification. Verification refers to the task of matching the same biometric signature from a single individual taken at different times, possibly, and often, with different devices. Identification refers to the task of matching the same biometric signature from a single person given a dictionary of several signatures from several individuals. Verification is referred to as a one to one (1-1) task, and identification is referred to as a one-to-many (1-N) task. The biometric matching task is usually performed by a single computing device, e.g., smart phone, laptop computer, specialized hardware.

Neural networks are computationally intelligent techniques, and can be used for accomplishing the task of biometric recognition. Neural networks can be expert classifiers that learn how to distinguish objects and aspects of objects from others based on properly labeled training data. Deep neural networks are considered well suited for analyzing large numbers (e.g., millions) of images and being able to classify specifically labeled objects or features learned from its training set on images to which it has not been previously introduced. A major feature of deep learning is layer-wise representation learning, which abstracts the features of prior layer to generate features, representative of images in reduced dimensions.

BRIEF SUMMARY

A computer-implemented method, in one aspect, may include receiving image data. The method may also include running the image data through a neural network, the neural network producing a vector representation of the image data. The method may also include creating random sparse sampling masks. The method may further include masking the vector representation of the image data with each of the random sparse sampling masks, the masking generating corresponding sparsely sampled vectors. The method may further include transmitting the sparsely sampled vectors to nodes of a consensus network, wherein a sparsely sampled vector of the sparsely sampled vectors is transmitted to a node of the consensus network. The method may also include receiving votes from the nodes of the consensus network. The method may further include determining whether a consensus is achieved in the votes. The method may further include, responsive to determining that the consensus is achieved, providing at least one of identification and verification of the image data.

A system, in one aspect, may include at least one hardware processor coupled to a computer network and a memory device may be coupled to the at least one hardware processor. A trained neural network may be stored on the memory device. At least one hardware processor may be operable to receive image data. At least one hardware processor may be also operable to run the image data through the neural network, the neural network producing a vector representation of the image data. At least one hardware processor may be also operable to create random sparse sampling masks. At least one hardware processor may be also operable to mask the vector representation of the image data with each of the random sparse sampling masks, the masking generating corresponding sparsely sampled vectors. At least one hardware processor may be also operable to transmit the sparsely sampled vectors to nodes of a consensus network, wherein a sparsely sampled vector of the sparsely sampled vectors is transmitted to a node of the consensus network. At least one hardware processor may be also operable to receive votes from the nodes of the consensus network. At least one hardware processor may be also operable to determine whether a consensus is achieved in the votes. At least one hardware processor may be also operable to, responsive to determining that the consensus is achieved, provide at least one of identification and verification of the image data.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Biometric systems may utilize neural networks with full image and hashing, or a vector representation of the image from the final neural network and hashing. In the present disclosure, in some embodiments, a method, system and techniques may be provided, which include a neural network performing biometric verification and/or identification. In some embodiments, the method, system and techniques use a sparse (e.g., "scrambled") representation of an image (e.g., sparse vector representation) from the final layer of the neural network and distribute different sparse representations to the nodes in the consensus network. In some embodiments, the nodes in the consensus network then vote on the verification and/or identification process. In some embodiments, no single node has sufficient confidence to perform the verification or identification tasks, and a task of verification or identification can only be completed when consensus is achieved within the consensus network (e.g., responsive to the nodes achieving consensus).

The sparse representations provide a benefit of improved security, for instance, since a single sparse representation is insufficient to identify or verify the image (e.g., the individual in the image) or to recreate the original data. The sparse representations of an image provide a benefit of having reduced data transfer. For instance, a much smaller data packet is sent over a network connection compared to systems which require the full image to be sent, resulting in lower data costs. In addition, in some embodiments, no central database of images is required for verification and/or identification, thereby reducing the risk of a data breach, which can be catastrophic.

In some embodiments, the method and system of the present disclosure allows for performing cancelable biometrics, using a neural network, while keeping the original biometric data anonymous and not transmitted in its entirety over a consensus network (e.g., a network of participating computers or nodes being used for consensus mechanism). Briefly, cancelable biometrics refer to repeated distortions in biometric feature to protect true data. Canceleable biometrics have features such as being irreversible (e.g., cannot algorithmically recover true biometric), accurate, diverse (transformations using different functions are different), and revocable (transformation can be discarded and replaced with the same biometric feature, and not match to original transformed biometric). In some aspects, the system and method of the present disclosure implements networked consensus and neural networks to learn a small piece of individual biometric information. For instance, pieces of the final layer of a neural network are sent to other networked machines (machines or computers participating in the consensus). Each of the machines performs an evaluation function that matches the piece sent to it (received by it), and can return a list of labels or persons to whom the features could belong. The consensus mechanism includes determining whether the labels evaluated by the different machines or computers in the network agree to a threshold degree, for example, whether a threshold number of the machines agree on the labels. Before the sparse representations are sent out, the initially learned (trained) neural network model is sent to all machines on the network. A neural network learns several abstract representation features of an individual's biometric. Each machine, for example, can identify feature subsets of an image and label the feature subsets.

Figure 1:
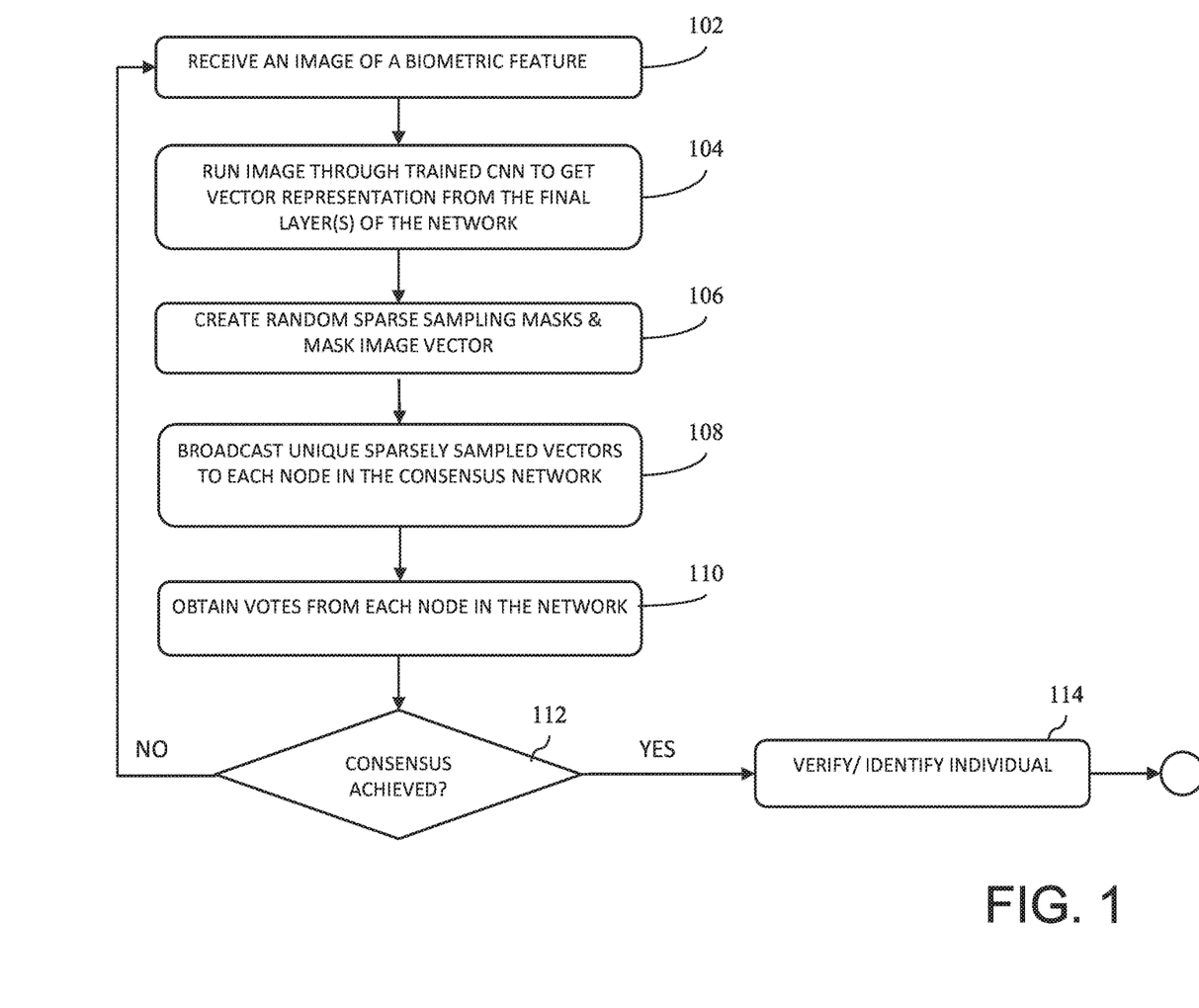
FIG. 1 is a diagram illustrating a method in one embodiment

FIG. 1 is a diagram illustrating a computer-implemented method in one embodiment. The method may be executed by or run on one or more hardware processors such as a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein.

At 102, an image may be received of a biometric feature. For example, an image may include a facial image of an individual, a fingerprint, or another biometric feature. The following description refers to a biometric feature, for example, of an individual, however, the image need not be limited to a biometric feature, but can be an image of an object, for instance, having one or more features. Thus, for example, the system and/or method of the present disclosure may work with images other than of a biometric feature, for example, by training the neural network to recognize that particular object or one or more features of that object.

At 104, the image is run through a trained neural network, e.g., a convolutional neural network (CNN), which produces a vector representation of the image, for instance, at its final layer or layers. The vector representation is obtained from the final layer or layers of the neural network e.g., CNN.

At 106, random sparse sampling masks are created and a mask image vector is created or generated, for example, corresponding to each sparse sampling mask. For example, the vector representation is masked with a random sparse sampling mask, for each of the random sparse sampling masks, creating a plurality of unique sparsely sampled vectors. In some embodiments, each of the plurality of unique sparsely sampled vectors is unique, for example, as each of the sparse sampling masks is randomly generated to be unique. For example, the output of a CNN neural network at the final layer is a representation vector of the given input. The representation vector can be of any dimension, for instance, depending on the neural network architecture or model that is set up. For instance, consider a 50 dimensional representation vector (e.g., an array of 50 numbers or values). The final layer may be a flattened layer. In this example, a mask is generated by creating another array of 50 dimension, but in this array representing a mask, some of the numbers are 0s while others are 1s, with the arrangement of 0s and is in the array being randomly assigned. The mask is also referred to as a random mask or random sparse sampling mask. This array when multiplied pointwise with the representation vector generated by the neural network (e.g., the final layer of CNN to be input to a fully connected neural network), results in a masked vector (also referred to as a mask image vector). In some embodiments, the method and/or system of the present disclosure creates many masks (each randomly generated) and multiplies with many copies of same image output from the neural network (the representation vector, e.g., the final layer of CNN.)

At 108, unique sparsely sampled vectors are broadcast or transmitted to nodes in a consensus network. For instance, a unique sparsely sampled vector is broadcast to a node in the consensus network, where for example, a different one of the unique sparsely sampled vectors is broadcast or transmitted to a different one of the nodes the consensus network. A node in the consensus network, for example, receives a unique sparsely sampled vector. The consensus network, for example, includes computers (nodes), also referred to as machines, connected via a network, for example, a computer network. Each of the computers in the consensus network has a copy of the trained neural network that can recognize various features of an input image (e.g., the final layer produced by CNN to run through the fully connect neural network.

At 110, a vote from each node in the consensus network (which received a sparsely sampled vector) is obtained. A vote for consensus, for example, is the confidence or likelihood score of match between sparsely sampled vectors, and another model trained over all biometric data recorded during registration. Every node maintains a copy of this model. For example, a type of network called Siamese Networks can perform this task.

At 112, it is determined whether the consensus is achieved. For instance, each of the nodes in the consensus network may provide a vote. Example forms of the vote can be a confidence or likelihood score of match between sparsely sampled vectors, and another model trained over all biometric data, or a binary vote such as 0 ("no") or 1 ("yes"). For example, responsive to determining that all nodes voted "yes", it may be determined that the consensus is achieved. As another example, if the likelihood scores received from the nodes of the consensus network meets a criterion or a threshold, it may be determined that the consensus is achieved. Other consensus algorithms may be employed such as the *Byzantine* General Problem. Whether consensus is reached is determined based on all the confidence scores obtained from individual nodes.

At 114, responsive to determining that the consensus is achieved, the input image of the biometric feature (or e.g., another object feature) is verified or identified. For instance, at 114, at least one of identification or verification of the image data is confirmed. In some embodiments, verification involves matching the image to other images of the same individual or object taken at different times. In some embodiments, identification involves matching the image to a given dictionary of images of several individuals or objects. For instance, each of the consensus network nodes may perform the verification and/or identification of a piece of the image given to it (e.g., by way of the mask image vector) as described above, and provide a vote, which is used to determine verification and/or identification. For example, as described above, individual computer performs verification (or identification), comparing the masked representation feature that was broadcasted (e.g., from another participating node) to it. In some embodiments, a common neural network model is trained over all biometric images (e.g., during registration). A copy of this neural network model is held or locally stored by all nodes (computers in network). A network like Siamese Network (which provides a similarity score between inputs), takes this model and compares it with a sparsely represented image vector (that was broadcasted), and returns the confidence score. This score is considered for voting. Generally, each computer is looking at a partial image (a unique mask vector sent to it, for example, broadcast), and matching with a model trained over all images, and each computer providing a vote for consensus.

Figure 2:
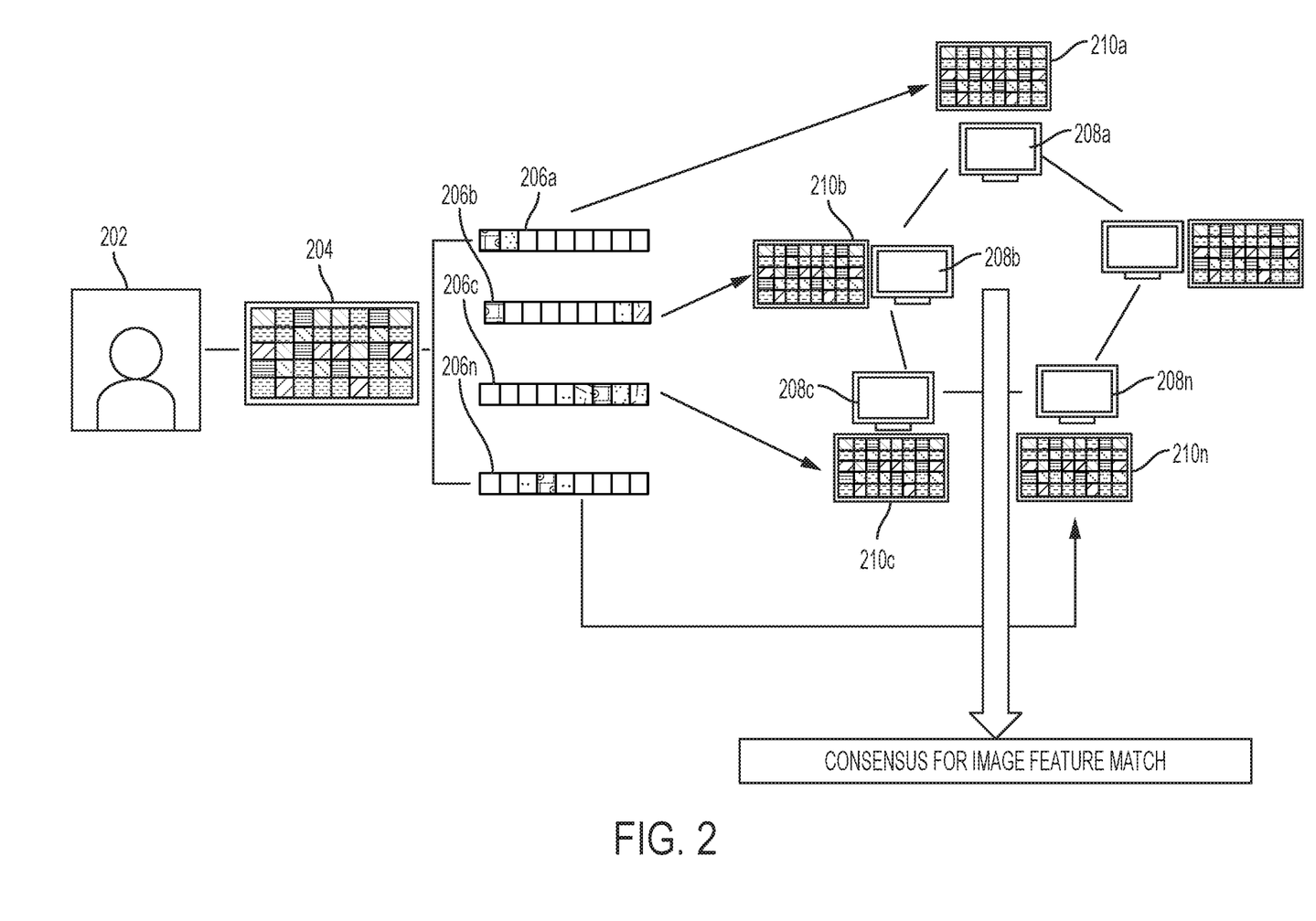
FIG. 2 is a diagram illustrating an example consensus matching in one embodiment.

FIG. 2 is a diagram illustrating an example consensus matching in one embodiment. An image 202 may be received. The image may be of a biometric feature, or another object feature. A neural network, for example, CNN is run with the received image and a vector representation 204 is created. The vector representation is masked, for example, with different (e.g., unique) random sparse sampling masks, producing unique sparsely sampled vectors 206a, 206b, 206c, 206n. The unique sparsely sampled vectors 206a, 206b, 206c, 206n are broadcast to nodes in the consensus network. For example, a unique sparsely sampled vector 206a is broadcast to a node 208a; a unique sparsely sampled vector 206b is broadcast to a node 208b; a unique sparsely sampled vector 206c is broadcast to a node 208c; a unique sparsely sampled vector 206n is broadcast to a node 208n. Each of the nodes receiving a unique sparsely sample vector votes on the vector. For example, initially (e.g., during a registration stage), the participating nodes in the consensus network receives a trained neural network model, which can recognizes features of a given image, e.g., shown at 210a, 210b, 210c, 210n. The participating nodes, in one aspect, locally store a copy of the trained neural network model. Responsive to receiving a piece of the given image (e.g., one of 206a, 206b, 206c, 206n), and for example a request to verify of identify the piece of the given image, a node in the consensus network runs its copy of the neural network model (a fully connected network) with the piece of the given image as input. The neural network outputs a label and provides a vote. The vote is directly related to the label. For example, in one aspect, the label itself may be provided as a vote. Responsive to determining that the votes from the nodes are in agreement (e.g., consensus reached by all the nodes (e.g., those that received and voted on a unique sparsely sample vector)), the image 202 is verified and/or identified In one aspect, a computer that broadcasts the sparsely sampled vectors may be a part the consensus network (albeit, not performing the voting itself). In another aspect, the computer that performs broadcasts the sparsely sampled vectors may be a remote computer connected or coupled to the consensus network of nodes or computers via network such as a computer network and/or another network. The nodes of the consensus network may be remote computers connected via a network such as a computer network and/or another network.

Figure 3:
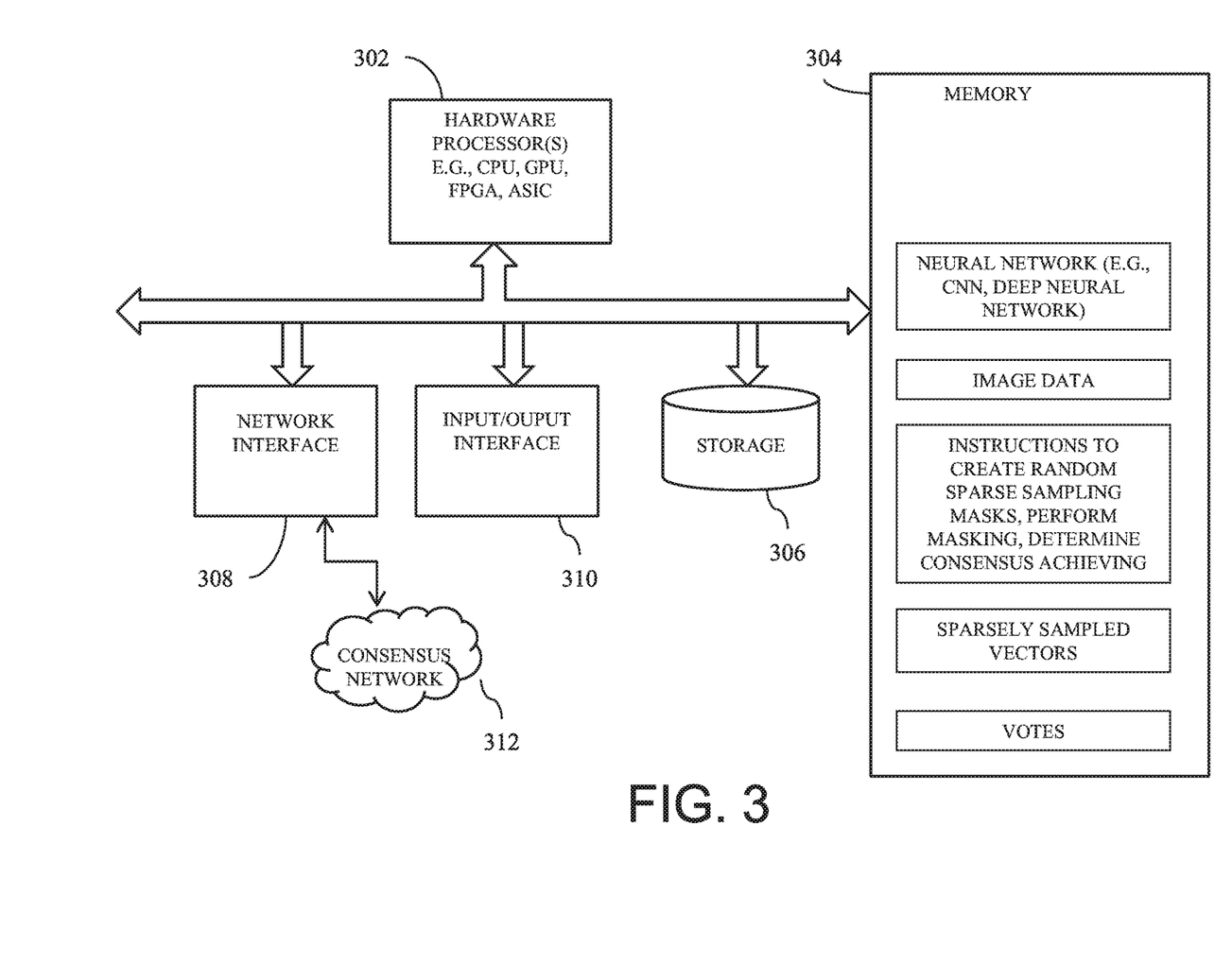
FIG. 3 is a diagram showing components of a system in one embodiment

FIG. 3 is a diagram showing components of a system in one embodiment, which for example, performs image processing and consensus achieving, for example, for image recognition, verification and/or identification. One or more hardware processors 302 such as a central processing unit (CPU), a graphic process unit (GPU), and/or a Field Programmable Gate Array (FPGA), an application specific integrated circuit (ASIC), and/or another processor, may be coupled with a memory device 304, and generate a prediction model and recommend communication opportunities. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium. The memory device 304 may, for example, store instructions and/or data for functioning of the one or more hardware processors 302, and may include an operating system and other program of instructions and/or data. One or more hardware processors 602 may be coupled with interface devices such as a network interface 308 for communicating with remote systems, for example, via a network, and an input/output interface 310 for communicating with input and/or output devices such as a keyboard, mouse, display, and/or others.

At least one hardware processor 302 (also referred to as a hardware processor) may receive input comprising image data, which for example, may be stored on the memory device 304, for example, temporarily for processing. For instance, a hardware processor 302 may run a neural network with the image data or feature of the image data as input, which neural network produces a vector representation of the image data. A hardware processor 302 may create random sparse sampling masks and mask the vector representation using the created random sparse sampling masks, for example, as described above with reference to FIG. 1. Masking, for example, creates or generates sparsely sampled vectors, each of which in some embodiments is unique. Sparsely sampled vectors may be stored in a memory 304 and/or storage device 306. A hardware processor 302 broadcasts or transmits the sparsely sampled vectors to nodes of a consensus network, for example, via a network interface 308, wherein a sparsely sampled vector of the sparsely sampled vectors is transmitted to a node of the consensus network 312. A hardware processor 302 receives votes from the nodes of the consensus network 312, and determines whether a consensus is achieved in the votes. Responsive to determining that the consensus is achieved, a hardware processor 302 may provide at least one of identification or verification of the image data.

Figure 4:
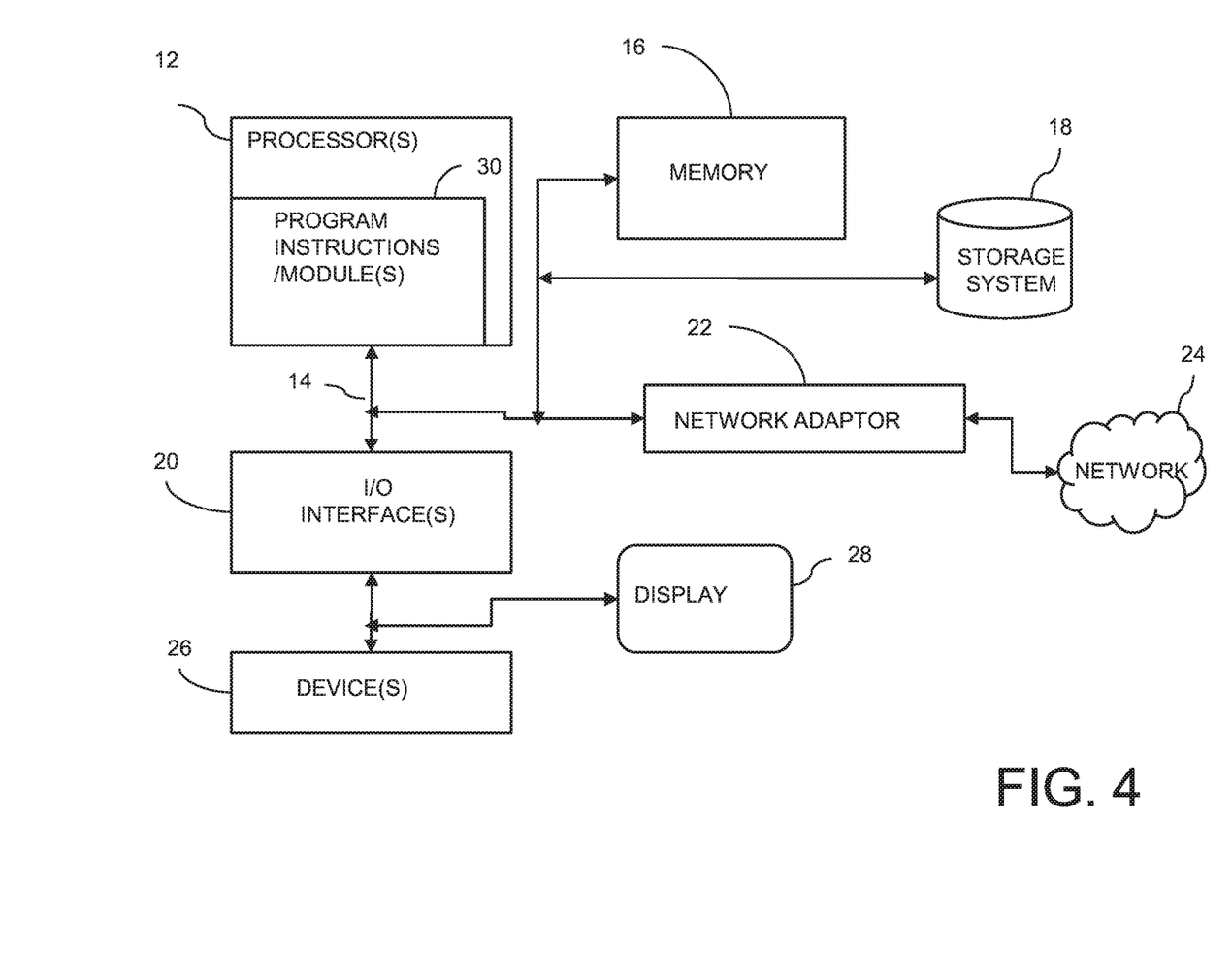
FIG. 4 illustrates a schematic of an example computer or processing system that may implement a system according to one embodiment.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
    creating sampling masks;
    masking a vector representation of data with a sampling mask of the sampling masks, wherein the masking is iterated with different ones of the sampling masks, the vector representation produced by a neural network and representing features associated with the data, the masking generating corresponding sampled vectors;
    transmitting the sampled vectors to nodes of a network, wherein a sampled vector of the sampled vectors is transmitted to a node of the network;
    receiving votes from the nodes;
    determining whether a consensus is achieved in the votes; and
    responsive to determining that the consensus is achieved, providing an identification of the data.

2. The method of claim 1, wherein the neural network comprises a convolutional neural network (CNN), and the vector representation is obtained from a final layer of the CNN.

3. The method of claim 1, wherein the neural network comprises a deep neural network, the vector representation obtained from a final layer of the deep neural network.

4. The method of claim 1, wherein each of the sampling masks is unique.

5. The method of claim 1, wherein each of the sampled vectors is unique.

6. The method of claim 1, wherein the data includes an image of a biometric feature.

7. The method of claim 1, wherein the data includes an image of an object.

8. A computer program product comprising a computer readable storage medium having program instructions embodied therewith, the program instructions executable by a device to cause the device to:
create sampling masks;
mask a vector representation of data with a sampling mask of the sampling masks, wherein masking is iterated with different ones of the sampling masks, the vector representation produced by a neural network and representing features associated with the data, masking iteratively generating corresponding sampled vectors;
transmit the sampled vectors to nodes of a network, wherein a sampled vector of the sampled vectors is transmitted to a node of the network;
receive votes from the nodes;
determine whether a consensus is achieved in the votes; and
responsive to determining that the consensus is achieved, provide an identification of the data.

9. The computer program product of claim 8, wherein the neural network comprises a convolutional neural network (CNN), and the vector representation is obtained from a final layer of the CNN.

10. The computer program product of claim 8, wherein the neural network comprises a deep neural network, the vector representation obtained from a final layer of the deep neural network.

11. The computer program product of claim 8, wherein each of the sampling masks is unique.

12. The computer program product of claim 8, wherein each of the sampled vectors is unique.

13. The computer program product of claim 8, wherein the data includes an image of a biometric feature.

14. The computer program product of claim 8, wherein the data includes an image of an object.

15. A system comprising:
at least one hardware processor coupled to a computer network; and
a memory device coupled to the at least one hardware processor;
the at least one hardware processor configured to at least:
create sampling masks;
mask a vector representation of data with a sampling mask of the sampling masks, wherein masking is iterated with different ones of the sampling masks, the vector representation produced by a neural network and representing features associated with the data, masking iteratively generating corresponding sampled vectors;
transmit the sampled vectors to nodes of a network, wherein a sampled vector of the sampled vectors is transmitted to a node of the network;
receive votes from the nodes;
determine whether a consensus is achieved in the votes; and
responsive to determining that the consensus is achieved, provide an identification of the data.

16. The system of claim 15, wherein the neural network comprises a convolutional neural network (CNN), and the vector representation is obtained from a final layer of the CNN.

17. The system of claim 15, wherein the neural network comprises a deep neural network, the vector representation obtained from a final layer of the deep neural network.

18. The system of claim 15, wherein each of the sampling masks is unique.

19. The system of claim 15, wherein each of the sampled vectors is unique.

20. The system of claim 15, wherein the data includes an image of a biometric feature.

* * * * *